Sept. 5, 1933.　　　　C. B. DRAKE　　　　1,925,437

CLOCK

Filed Sept. 21, 1932　　2 Sheets-Sheet 1

INVENTOR.
Charles B. Drake.

BY Milans & Milans
ATTORNEYS.

Sept. 5, 1933.  C. B. DRAKE  1,925,437
CLOCK
Filed Sept. 21, 1932   2 Sheets-Sheet 2
*Fig. 4.*
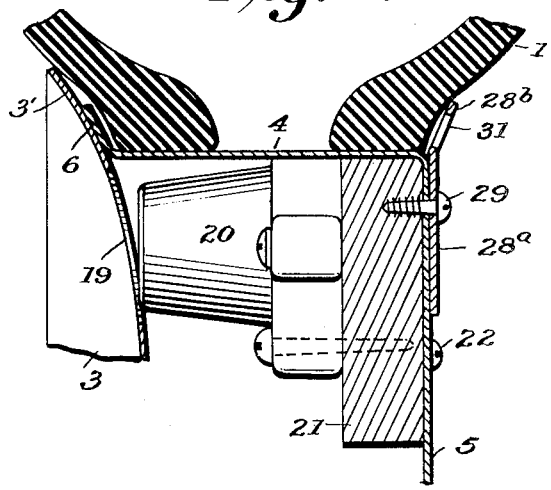
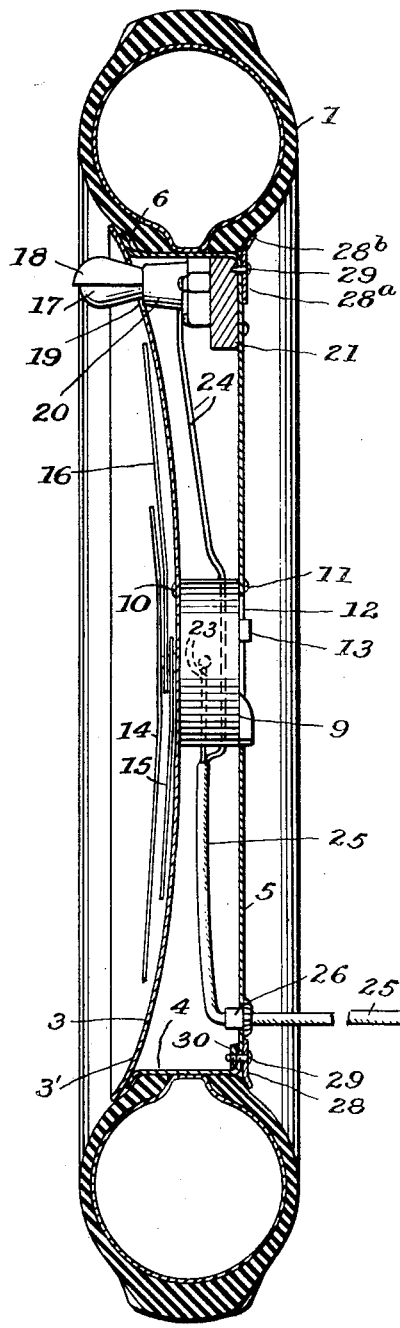
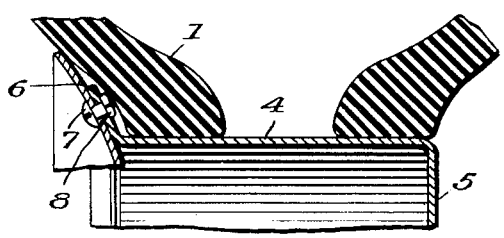
*Fig. 5.*
*Fig. 3.*
INVENTOR.
*Charles B. Drake.*
BY *Milane & Milane*
ATTORNEYS Patented Sept. 5, 1933

1,925,437

UNITED STATES PATENT OFFICE 1,925,437

CLOCK

Charles B. Drake, Norfolk, Va.

Application September 21, 1932
Serial No. 634,230

5 Claims. (Cl. 58—56)

This invention relates to improvements in clocks and more especially to an improved clock particularly adapted for use in connection with an automobile tire for advertising display purposes but also serviceable alone for general use.

Objects of the invention are to provide an improved clock adapted to be mounted in the central opening of an automobile tire and cooperate therewith to provide an attractive display, to provide a construction of this character which can be easily secured in position on the tire and removed therefrom, and which will be of a simple, efficient nature and can be manufactured at low cost.

Another object of the invention is to provide an improved clock of the character referred to equipped with means of a simple, efficient nature for securing the same to an automobile tire and also adapted to serve as means for attaching the clock to a wall or other support.

Other objects and advantages of the invention, and the particular construction, combination and arrangement of parts comprising the same, will be understood from the hereinafter contained detailed description, when considered in connection with the accompanying drawings forming part hereof and illustrating one embodiment of the invention.

In the drawings:

Fig. 3 is a transverse section, on an enlarged scale, on the line 3—3 of Figure 1.

Fig. 4 is a detail section, on an enlarged scale, on the line 4—4 of Figure 1.

Fig. 5 is a detail section, on an enlarged scale, on the line 5—5 of Figure 1.

Figure 1:
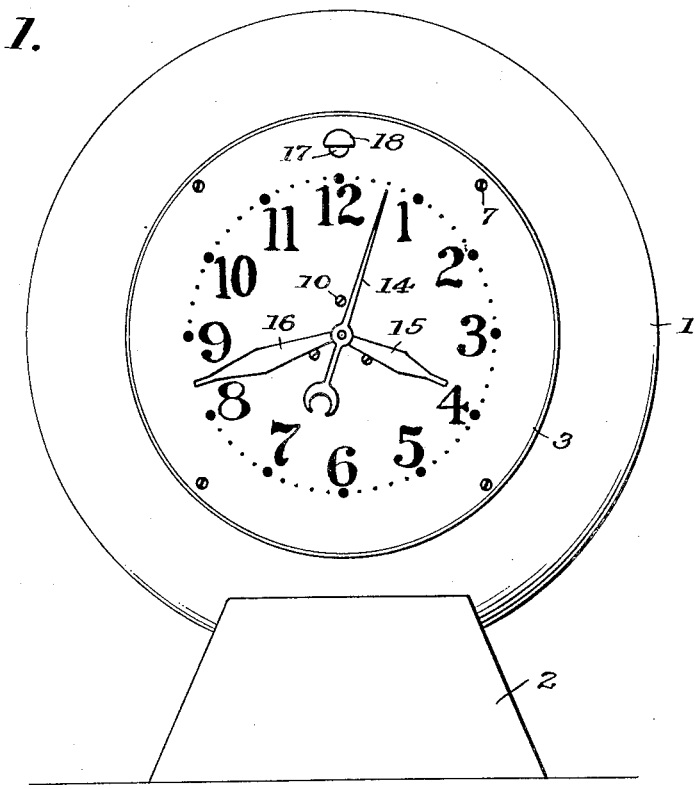
Figure 1 is a front elevation of a clock constructed in accordance with the present invention mounted in an automobile tire, the tire being shown on a display stand or holder.

While a preferred embodiment of the invention is illustrated in the drawings, it will of course be understood that minor changes and modifications may be made in the particular construction shown, and the invention may be embodied in other forms, as will appeal to those skilled in the art and falling within the scope of the appended claims, without departing from the spirit of the invention.

In the drawings, 1 designates an automobile tire of well known construction, and 2 is a display stand or holder for the tire.

Referring to a detailed description of the particular exemplification of my improved clock illustrated in the drawings, the construction shown comprises a casing including a front plate 3 and a hollow body part including an annular side wall 4 and back wall 5. The front plate 3 is dished inwardly, as shown. The diameter of the front plate is greater than the diameter of the hollow body part, and the latter is disposed centrally of the front plate so that the front plate has an outer annular peripheral portion 3' projecting outwardly beyond said hollow body part. The hollow body part at the forward end of its side wall 4 has a flange 6 extending at an angle to conform to the dish or curvature of the rear face of the front plate 3 and fitting thereagainst, the hollow body part 4, 5, being secured to the front plate by bolts 7 and nuts 8 or equivalent securing means, the bolts 7 passing through apertures in the flange 6 and the front plate. The hollow body part 4, 5, with its flange 6 is preferably constructed, as shown, from a continuous piece of metal in the form of a drawn stamping.

The front plate 3 is provided, as shown, with a clock dial, and mounted on the rear face of the front plate centrally thereof is an electric clock movement or mechanism contained in a casing 9. The electric clock movement may be of any suitable construction and the same is therefore only indicated in a general way.

The casing 9 of the electric clock mechanism is secured to the front plate 3 by screws 10 passing through the front plate and entering the front wall of the casing 9. The casing 9 is also secured to the back wall 5 by screws 11. The back wall 5 has an opening 12 to afford ready access to the starting and setting means 13 of the clock movement located at the rear of the casing 9. The clock mechanism has shafts extending through an opening in the front plate 3 and fixed on said shafts are hands 14, 15, and 16, which operate over the dial on the front plate to indicate the time.

At the upper part of the front plate 3 is an electric lamp 17 provided with a reflector 18 to project the light from the lamp downwardly over the dial. The electric lamp 17 extends through an opening 19 in the front plate 3 and is mounted in a socket 20 that is secured to a base 21 of wood or other suitable insulating material, the latter being in turn secured to the back wall 5 by screws 22. 23, 24, designate pairs of electrical conductors leading respectively to the electric clock mechanism and to the electric lamp 17 from a flexible conduit 25, said wires and flexible conduit extending into the casing through an insulated opening 26 in the back wall 5. 27 designates a terminal plug at the outer end of the flexible conduit for connecting the pairs of conductors 23, 24, to the supply system.

Figure 2:
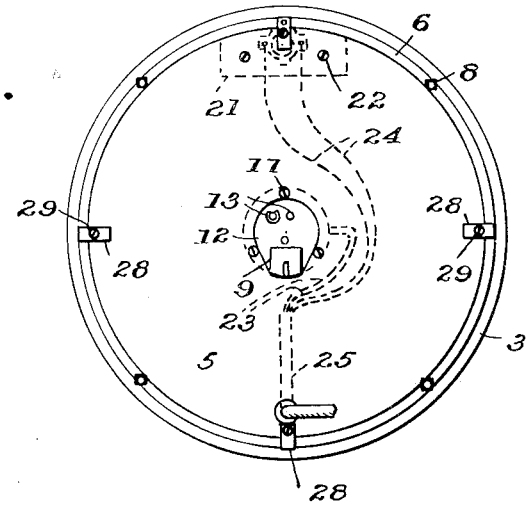
Fig. 2 is a rear elevation of the clock.

The clock is adapted to be mounted on the tire 1 as shown in Figure 2 of the drawings, the hollow casing part 4, 5, extending into the central opening of the tire with the flange 6 and the outer annular peripheral portion 3' of the front plate fitting against the outer face of one side of the tire, the inwardly dished front plate, which serves as the face of the clock, being so disposed with reference to the tire 1 as to cooperate therewith to simulate a disk wheel.

Arranged in spaced relation on the marginal portion of the back wall 5 are a plurality of cleats 28 adapted to engage over a side wall of the tire to secure the clock firmly in position on the tire. The cleats 28 each comprise a main strip part 28ª to fit against the back wall 5, and an outer end portion 28ᵇ disposed at an angle to the portion 28ª to fit against the outer face of a side wall of the tire at the bead thereof. The cleats are each connected to the back wall 5 to provide for positioning the same with their outer end portions 28ᵇ disposed within the boundary of the back wall 5 when the hollow body part 4, 5, is to be inserted within the central opening of the tire. In the present instance, the cleats 28 are each connected to the back wall 5 by a screw 29 extending through apertures in the portion 28ª of the cleat and said wall and engaging a threaded bore in a retaining plate 30 located at the inner side of said wall. As will be understood, when the screws 29 are loosened, the cleats can be turned back out of the way, and afterwards adjusted and secured in tire engaging position.

My improved clock is also adapted to be mounted on a wall for use without the tire. As shown in Figure 4 of the drawings, the cleat 28 that is located at the upper part of the back wall 5 is provided with an eye 31 and serves as a hanger to attach the clock to a wall or like support.

It will be noted that the particular construction of clock hereinbefore set forth, is of a character to cooperate with an automobile tire to afford a very attractive display. It can be readily secured in position on a tire and removed therefrom, and it is of a simple, efficient nature that can be manufactured at low cost.

What I claim is:

1. The combination with an automobile tire of a clock including a casing comprising a circular hollow body part having a back wall, and a circular front plate having an outer annular peripheral portion projecting outwardly beyond said hollow body part, said front plate having the design of a clock dial thereon, a clock mechanism within the casing and indicator hands connected therewith and arranged to operate over the dial, said circular body part being adapted to be mounted in the central opening of the tire with the outer peripheral portion of the front plate engaging the outer face of a bead of the tire, and means on the back wall of the hollow body part to engage the outer face of the opposite bead of the tire for removably holding the casing on the tire.

2. The combination with an automobile tire of a clock including a casing comprising a circular hollow body part having a back wall, and a circular, inwardly dished front plate having an outer annular peripheral portion projecting outwardly beyond said hollow body part, said front plate having the design of a clock dial thereon, and clock mechanism within the casing and indicator hands connected therewith and arranged to operate over the dial, said circular body part being adapted to be mounted in the central opening of the tire with the outer peripheral portion of the front plate engaging the outer face of a bead of the tire, and means on the back wall of the hollow body part to engage the outer face of the opposite bead of the tire for removably holding the casing on the tire.

3. A clock including a casing comprising a circular hollow body part having a back wall, and a circular front plate having an outer annular peripheral portion projecting outwardly beyond said hollow body part, the front plate having the design of a clock dial thereon, and clock mechanism within the casing and indicator hands connected therewith and arranged to operate over said dial, said circular body part being adapted to be mounted in the central opening of an automobile tire with the outer peripheral portion of the front plate engaging the outer face of a bead of the tire, and cleats on the back wall of the hollow body part movably connected therewith to be positioned to project outwardly beyond the same to engage the outer face of the opposite bead of the tire.

4. A clock including a casing comprising a circular hollow body part having a back wall, and a circular front plate having an outer annular peripheral portion projecting outwardly beyond said hollow body part, the front plate having the design of a clock dial thereon, clock mechanism within the casing and indicator hands connected therewith and arranged to operate over said dial, said circular body part being adapted to be mounted in the central opening of an automobile tire with the outer peripheral portion of the front plate engaging the outer face of a bead of the tire, and cleats on the back wall of the hollow body part movably connected therewith to be positioned to project outwardly beyond the same to engage the outer face of the opposite bead of the tire, one of said cleats being provided with an eye and being adapted to serve as a hanger for the clock.

5. A clock including a casing comprising an inwardly dished circular front plate and a hollow body part having an annular side wall and a back wall, said hollow body part being of less diameter than the diameter of the front plate and being provided at its forward end with an outwardly extending flange fitting against the rear face of the dished front plate centrally thereof, and securing members passing through said flange and through the front plate, said front plate having the design of a clock dial thereon, and clock mechanism within the casing and indicator hands connected therewith and operating over the dial, said hollow body part being adapted to be mounted in the central opening of an automobile tire with the outer projecting peripheral portion of the front plate engaging the outer face of a bead of the tire, and means on the back wall of the hollow body part to engage the outer face of the opposite bead of the tire for removably holding the casing on the tire.

CHARLES B. DRAKE.